United States Patent [19]
Pu et al.

[11] Patent Number: 5,483,365
[45] Date of Patent: Jan. 9, 1996

[54] METHOD FOR HOLOGRAPHIC STORAGE USING PERISTROPHIC MULTIPLEXING

[75] Inventors: Allen Pu; Kevin Curtis; Demetri Psaltis, all of Pasadena, Calif.

[73] Assignee: California Institute of Technology, Pasadena, Calif.

[21] Appl. No.: 241,163

[22] Filed: May 10, 1994

[51] Int. Cl.$^6$ .............................. G03H 1/12; G03H 1/10; G11B 7/00
[52] U.S. Cl. .................................. 359/11; 359/3; 359/10; 369/102; 369/103; 369/112
[58] Field of Search .................................. 359/1, 3, 11, 21, 359/22, 9, 15; 365/125; 369/102, 103, 112

[56] References Cited

U.S. PATENT DOCUMENTS 5,339,305   8/1994   Curtis et al. ............................ 369/112

Primary Examiner—Paul M. Dzierzynski
Assistant Examiner—Audrey Chang
Attorney, Agent, or Firm—Fish & Richardson

[57] ABSTRACT

A peristrophic multiplexing system directs a signal light beam and reference light beam onto a selected recording spot in the recording medium. The light beams collectively define a plane of interaction. Either the recording medium or the signal/reference beam are rotated relative to the other through a succession of peristrophic multiplexing angles. Those angles cause relative rotation about an axis that is not perpendicular to the plane of selectivity. The rotation occurs contemporaneously with the modulating of the hologram on the medium.

44 Claims, 3 Drawing Sheets

METHOD FOR HOLOGRAPHIC STORAGE USING PERISTROPHIC MULTIPLEXING

BACKGROUND OF THE INVENTION

1. Technical Field

The present invention relates to holographic memories, holographic storage systems and holographic processors.

2. Background Art

The number of holograms that can be multiplexed in a given holographic system is primarily a function of two parameters—the system's bandwidth (either temporal or spatial frequency) and the material's dynamic range. Recently, thin film materials have been developed with relatively large dynamic range. An example of such a material is DuPont's HRF-150 photopolymer. Previously, 10 angle-multiplexed holograms in a 38 μm thick film with diffraction efficiency of $10^{-3}$ have been reported. Because it is typical to work with holographic diffraction efficiencies on the order of $10^{-6}$, there is sufficient dynamic range to record significantly more than 10 holograms. The angular bandwidth limitation can be alleviated by making the film thicker but scattering increases rapidly with thickness in these materials. Another method that has been previously used to increase the utilization of the available bandwidth of the system is fractal sampling grids.

SUMMARY OF THE DISCLOSURE

The invention is embodied in a method of recording multiplexed holograms in a holographic recording medium, constituting the steps of directing a signal light beam and a reference light beam onto a selected recording spot in the recording medium, the signal and reference light beams defining a plane of interaction of the recording medium, successively modulating the signal light beam in accordance with a succession of holograms to be recorded in the recording medium and first rotating one of (a) the recording medium, (b) the signal and reference light beams, relative to the other through a succession of peristrophic multiplexing angles about an axis non-perpendicular to the plane of interaction simultaneously with the successively modulating step.

Successive ones of the succession of peristrophic multiplexing angles are separated by a predetermined difference angle. The predetermined difference angle is sufficient to either Bragg mis-match or spatially shift reconstructed holograms recorded at successive ones of the angles by a predetermined amount. Specifically, the selected hologram recorded in the recording medium is reproducible from the recording medium by projecting the reference beam onto the selected spot and providing a detector plane of a particular field of view at a location in a holographic projection beam path of the selected hologram. In one embodiment, the difference angle is sufficient to spatially filter out unselected holograms recorded at other peristrophic multiplexing position (angles) relative to the peristrophic multiplexing angle of the selected hologram. Alternatively, the difference angle is sufficient to create a Bragg mis-match with the reference beam and the unselected holograms recorded at other peristrophic multiplexing angles relative to the peristrophic multiplexing angle of the selected hologram.

The invention may be combined with other holographic multiplexing techniques such as, for example, angular multiplexing, wavelength multiplexing and so forth.

In one embodiment of such a combination, the recording of a set of successive holograms is simultaneous with the angular multiplexing rotation through a succession of angles, and is repeated after each peristrophic rotation of the next peristrophic multiplexing angle for the recording of the next set of hologram. In this embodiment, the modulating step successively modulates the signal beam with a set of successive holograms corresponding to the succession of angular multiplexing angles while the second rotating step is performed and thereafter the first rotating step rotates the recording medium to a next one of the succession of peristrophic multiplexing angles. Preferably, each set of holograms corresponds to a maximum number of holograms that can be angularly multiplexed in a single recording spot in the medium.

In another embodiment, the recording of successive holograms is simultaneous with the peristrophic rotation through a succession of peristrophic multiplexing angles, and is repeated after each angular multiplexing rotation to the next angular multiplexing angle for the recording of the next set of holograms. In this embodiment, each set of holograms corresponds to the maximum number of holograms that can be peristrophically multiplexed in a single recording spot in the medium.

In yet another embodiment of the invention, an optical holographic correlator is realized by reconstructing ("reading out") holograms recorded in the medium by projecting onto the medium a signal beam from the spatial light modulator representing, for example, an unknown image, while blocking the reference beam from the recording medium. This produces a correlation function at a detector plane at the origin of the now-blocked reference beam with which the holograms were previously recorded.

DETAILED DESCRIPTION OF THE PREFERRED EMBODIMENTS

This specification describes peristrophic multiplexing as a solution to the bandwidth limited density and capacity problem. (The word peristrophic is Greek for rotation). With this method the hologram is physically rotated with the axis of rotation being perpendicular to the film's surface every time a new hologram is stored. The rotation does two things. It shifts the reconstructed hologram away from the detector allowing a new hologram to be stored and viewed without interference, and it can also cause the stored hologram to become non-Bragg matched. In addition, peristrophic multiplexing can be combined with other multiplexing techniques such as angle or wavelength multiplexing to increase the storage density and with spatial multiplexing to increase the storage capacity of the system.

Figure 1:
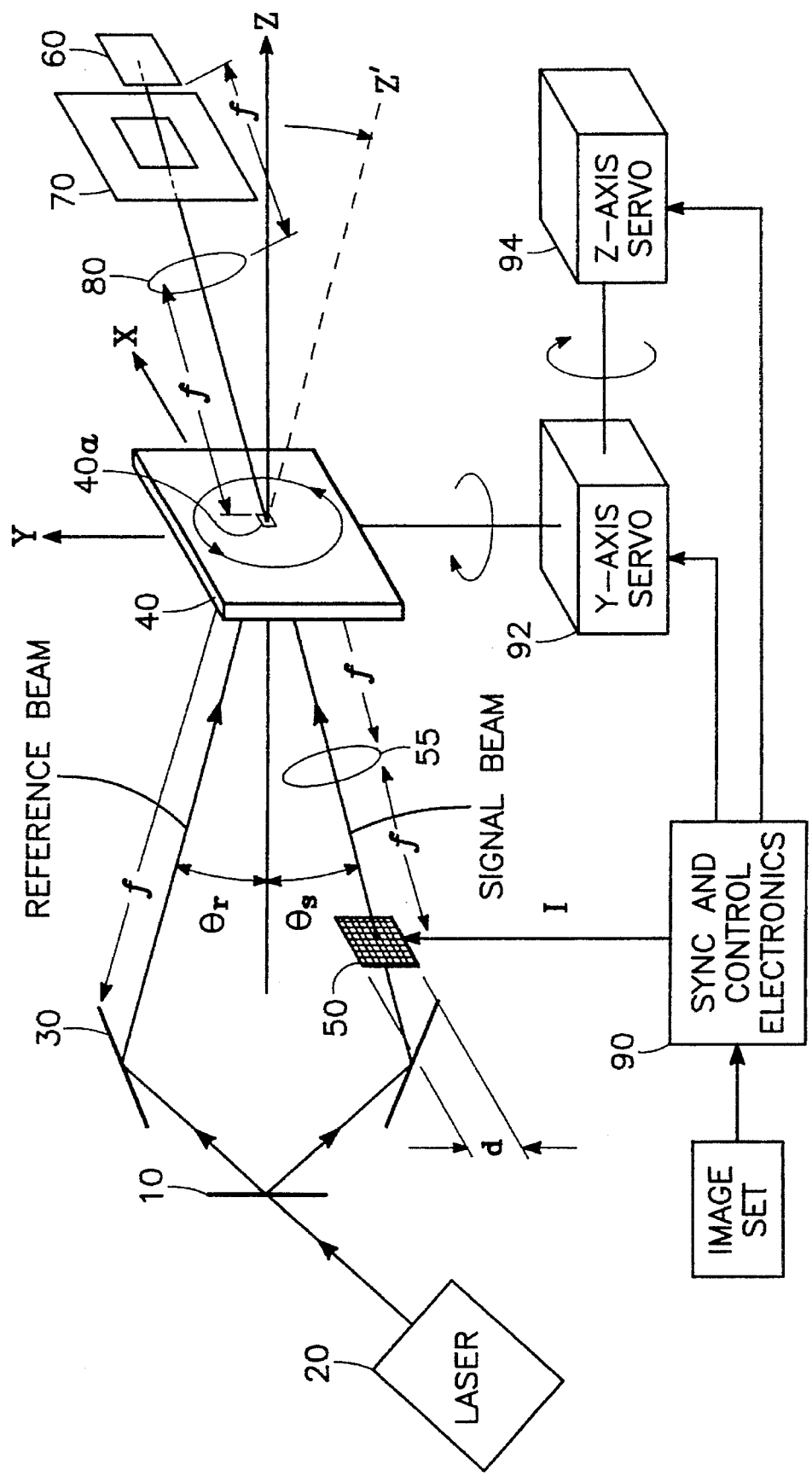
FIG. 1 is a schematic diagram of an exemplary holographic storage system embodying the invention.

Referring to FIG. 1, a beam splitter 10 splits a coherent monochromatic light beam from a laser 20 into a reference beam (R) and a signal beam (S) which are directed and collimated by optics 30 to a selected recording spot 40a in a holographic recording medium 40 such as a thin lithium niobate film and/or a photopolymer film. A spatial light modulator (SLM) 50 modulates the signal beam S in accordance with an input image I. A lens 55 of focal length F between the SLM 50 and the recording medium 40 is displaced from both the SLM 50 and the film 40 by its focal length F, as indicated in the drawing. The signal and reference beams S and R produce an interference pattern in the holographic recording medium 40 which is at least semi-permanently recorded therein. In order to read out the recorded hologram, the reference beam R is projected at the same angle to the same recording spot 40a, to produce an output beam O incident on a detector plane or focal plane array 60 through a spatial filter 70 with aperture A. A lens 80 of focal length F between the detector plane 60 and the film 40 is displaced from both the detector plane 60 and the film 40 by its focal length F.

Angular multiplexing is conventionally performed by applying a succession of input images to the spatial light modulator 50 while rotating the recording medium 40 about the Y axis through a corresponding succession of angles while the signal and reference beams S and R continue to illuminate the same recording spot 40a. The Y axis is perpendicular to the plane of interaction defined by the reference beam R and the signal beam S. The plane of interaction is defined such that both the reference beam R and the signal beam S lie in the plane of interaction.

In accordance with the present invention, peristrophic multiplexing is performed by applying a succession of input images to the spatial light modulator 50 while rotating the recording medium 40 about any axis that is not perpendicular to the plane of interaction through a corresponding succession of angles. In one preferred embodiment, this rotation is performed about the Z axis (shown in FIG. 1) lying in the plane of selectivity.

The peristrophic multiplexing process of the invention can be combined with any holographic multiplexing technique, such as angular multiplexing, wavelength multiplexing, phase code multiplexing and the like. When combined with angular multiplexing, the invention is carried out by angularly multiplexing a maximum number of holograms in the selected recording spot 40a, rotating the medium by a predetermined angle about the Z axis (or any axis not perpendicular to the plane of interaction) and then angularly multiplexing another set of holograms in the same spot. This sequence is repeated until a maximum range of peristrophic multiplexing angles (rotation about the Z axis) has been reached. Then, the entire process is carried out at a next recording spot in the medium.

In an alternative embodiment, the order of the angular multiplexing and peristrophic multiplexing steps may be reversed, in which case the rotation about the angular multiplexing Y axis to the next angular multiplexing angle is followed by a peristrophic rotation (about the Z axis, for example) through successive peristrophic rotation angles while recording the next succession of holograms.

In one implementation, synchronization and control electronics 90 synchronizes the spatial light modulator 50 with the motion of a Y-axis servo 92 governing rotation of the recording medium 40 about the Y axis during angular multiplexing and a Z-axis servo 94 governing rotation of the Y-axis servo 92 and the recording medium 40 about the Z axis. In this implementation, the Z axis servo 94 is stationary while both the Y axis servo 92 and the recording medium 40 rotate about the Z axis under control of the Z axis servo 94, although this relationship may be reversed in other implementations, as in the alternative embodiment described above.

While FIG. 1 has been described in terms of rotating the recording medium, the invention may be carried out just as well by rotating the signal and reference beams at their intersection with the recording medium about the desired axis (e.g., the Z axis) relative to the recording medium 40.

Although the exemplary embodiment of FIG. 1 has been described with reference to mechanical rotation stages or servos 92, 94 to achieve the desired angular multiplexing and peristrophic multiplexing rotations, such rotations are preferably implemented with conventional optical techniques employing, for example, acousto-optical devices or deflectors, dove prisms, and so forth.

A selected one of the peristrophically multiplexed holograms thus recorded in the film 40 is reconstructed or projected onto the detector plane 60 ("read out") using the same procedure described above, except that only the reference beam is projected onto the film 40 as shown, the signal beam being blocked or turned off by the spatial light modulator 50.

Figure 2:
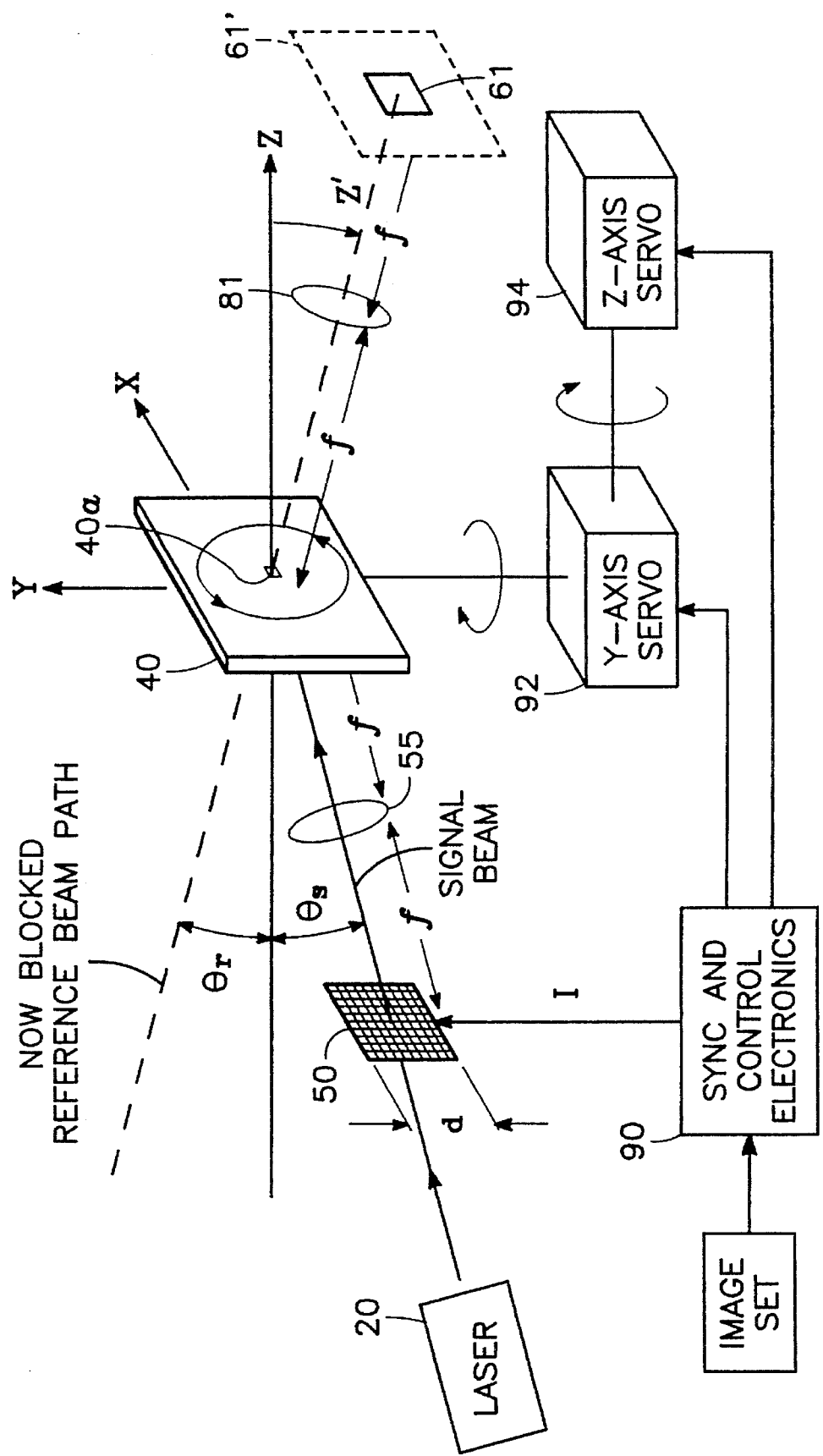
FIG. 2 is a schematic diagram of an exemplary holographic correlator embodying another aspect of the invention.

The invention may be used as an optical correlator or holographic processor illustrated in FIG. 2. This is accomplished after the peristrophically multiplexed holograms have been recorded in the film 40 as described in detail above. Than, rather than employing the reference beam to "read out" previously recorded holograms, a signal beam from the spatial light modulator 50 representing, for example, an unknown pattern, illuminates a selected spot on the film 40 while the reference beam is blocked from the film 40. As shown in FIG. 2, a correlation detector plane 61 lies on the opposite side of the film 40 aligned with the path of the now-blocked reference beam of FIG. 1. A lens 81 of focal length F between the film 40 and the correlation plane 61 is displaced from both the film 40 and the correlation plane 61 by its focal length F.

What is detected at the correlation detector plane 61 is a similarity pattern, such as a correlation or an inner product, between the pattern imposed by the spatial light modulator 50 and a particular one of the peristrophically multiplexed holograms recorded at the selected spot in the film 40. The particular one multiplexed hologram is determined by the peristrophic angle or position between the film 40 and the signal beam, as described in detail above. In other words, different ones of the peristrophically multiplexed holograms in the selected film spot are matched (e.g., correlated) with the unknown pattern by rotating the signal beam from the spatial light modulator 50 through various peristrophic multiplexing angles, as described above. In one embodiment, the similarity patterns (e.g., correlations) of all of the peristrophically multiplexed holograms recorded at the selected spot are rapidly read out one at a time (sequentially) at the correlation detector plane 61 by rotating either film 40 (or the signal beam from the SLM 50) through the entire range of peristrophic multiplexing angles while the SLM 50 continues to project the "unknown" pattern.

Alternatively, similarity patterns (e.g., correlations) of many or all of the peristrophically multiplexed holograms in the selected film spot are read out simultaneously. Such a parallel read-out is accomplished using an enlarged correlation detector plane 61' (dashed line in FIG. 2). Adjacent ones of the peristrophically multiplexed holograms appear simultaneously along the dashed-line arc in the enlarged correlation detector plan 61' of FIG. 2.

Each similarity pattern thus detected at the detector plane 61 (or 61') is either a two-dimensional correlation function, a two-dimensional inner product or a correlation in one dimension and an inner product in the other dimension, depending upon film thickness and storage format. If the stored holograms are image plane holograms, then the similarity pattern is an inner product. If the stored holograms are Fourier plane holograms, then the similarity pattern may be a two-dimensional correlation function, provided the film 40 is sufficiently thin (e.g., 40 microns). Otherwise, the similarity pattern at the correlation plane 61 is a correlation in one dimension and an inner product in the other dimension.

In the peristrophic holographic storage system of FIG. 1, the reference plane wave (R) is incident at an angle $\theta_r$ and the signal beam (S) is incident at an angle $\theta_s$, both angles measured with respect to the film's normal. Taking the center pixel of the hologram as the signal and neglecting any effects due to hologram thickness, the hologram transmittance can be written as $$R^*S = e^{-i2\pi \frac{\sin\theta_r}{\lambda} x} e^{-i2\pi \frac{\sin\theta_s}{\lambda} x} \quad (1)$$

The hologram is then rotated by $d\theta$ about the center of the x–y plane as shown in FIG. 1. Assuming the rotation is small, this results in the coordinates being transformed according to: $x' \approx x - y d\theta$, and $y' \approx y + x d\theta$. Substituting these relations into Eq. 1, the hologram be expressed in terms of the unrotated coordinates (x, y):

$$R^*S = e^{-i\frac{2\pi\sin\theta_r x}{\lambda}} e^{-i\frac{2\pi\sin\theta_s x}{\lambda}} e^{-i\frac{2\pi(\sin\theta_s+\sin\theta_r)d\theta y}{\lambda}} \quad (2)$$

After multiplying by R and Fourier transforming, the last term in Eq. 2 results a shift in the image. The rotation required to translate the image out of the detector aperture is approximately given by, $$d\theta \geq \frac{\frac{d}{F}}{\sin\theta_s + \sin\theta_r}, \quad (3)$$

where d is the size of the image at the detector plane and F is the focal length of the lens used. For image plane holograms, the expression is $$d\theta \geq \frac{\frac{2\lambda}{F}}{\sin\theta_s + \sin\theta_r}, \quad (4)$$

where $1/\delta$ is the highest spatial frequency in the image. For image plane holograms, the undesired holograms are filtered out at the Fourier plane of the system. Notice that this method can be combined with other multiplexing methods to further increase the storage density. Alternatively, holograms may be recorded at any intermediate Fresnel plane.

The Bragg selectivity, assuming the reference is given by $$R = e^{-i\left(\frac{2\pi\sin\theta_r}{\lambda}x + \frac{2\pi\cos\theta_r}{\lambda}z\right)}$$

and assuming the signal is given by $$S = e^{i\left(\frac{2\pi\sin\theta_s}{\lambda}x + \frac{2\pi\cos\theta_s}{\lambda}z\right)},$$

can be calculated using the Born and paraxial approximations and integrating over the volume of the hologram. Assuming that the transverse (x, y) dimensions of the film are much larger than the bandwidth of the images, the Bragg selectivity can be shown to be $$d\theta = \sqrt{\frac{2\lambda}{t}\left(\frac{\cos\theta_s}{\sin\theta_r(\sin\theta_s+\sin\theta_r)}\right)}, \quad (5)$$

where t is the thickness of the material. Using $\lambda=488$ nm, $t=38$ μm, and $\theta_x=\theta_r=30°$ results in a selectivity of about $12°$. The Bragg matching requirement is the dominant effect if $$\frac{d}{F} > \sqrt{2\lambda\cos\theta_s(\sin\theta_s+\sin\theta_r)/t\sin\theta_r}\ .$$

For most material thicknesses, the Bragg matching criterion determines the required rotation for peristrophic multiplexing. In our experiments, because the thickness of the film is only 38 μm, the image could be filtered out before the gratings become non-Bragg matched.

Experimental Results

The invention was tested using an experimental setup corresponding to FIG. 1 combining peristrophic and angle multiplexing. The film was located a significant distance from the Fourier plane so that the signal beam was approximately uniform. For each peristrophic position, multiple holograms are stored using standard angle multiplexing by rotating the medium. A spatial light modulator (SLM) was used to present holograms to the system. The reference and signal beams were initially incident at $\pm 30+$ from the film's normal. The reference beam intensity was 1.1 mW/cm$^2$ and the signal beam had 300 μW in about a 1 cm by 0.5 cm area. The film was rotated in-plane by 3° between each set of angle-multiplexed holograms to enable the other holograms to be filtered out.

Equation 3 predicts a required rotation of about 90° for Fourier plane hologram while Equation 4 predicts about 1.7° rotation for image plane. The 3° rotation was experimentally observed for the in-between (Fresnel) case we used. Each angle-multiplexed hologram was also separated by a 3° rotation. The initial exposure time was 0.11 seconds, but starting at hologram number 26, each hologram was exposed for 0.005 seconds longer than the previous hologram to correct for the lost sensitivity due to run time. There was a 1.5 second delay between hologram to allow the rotation stages to completely stop.

Figure 3:
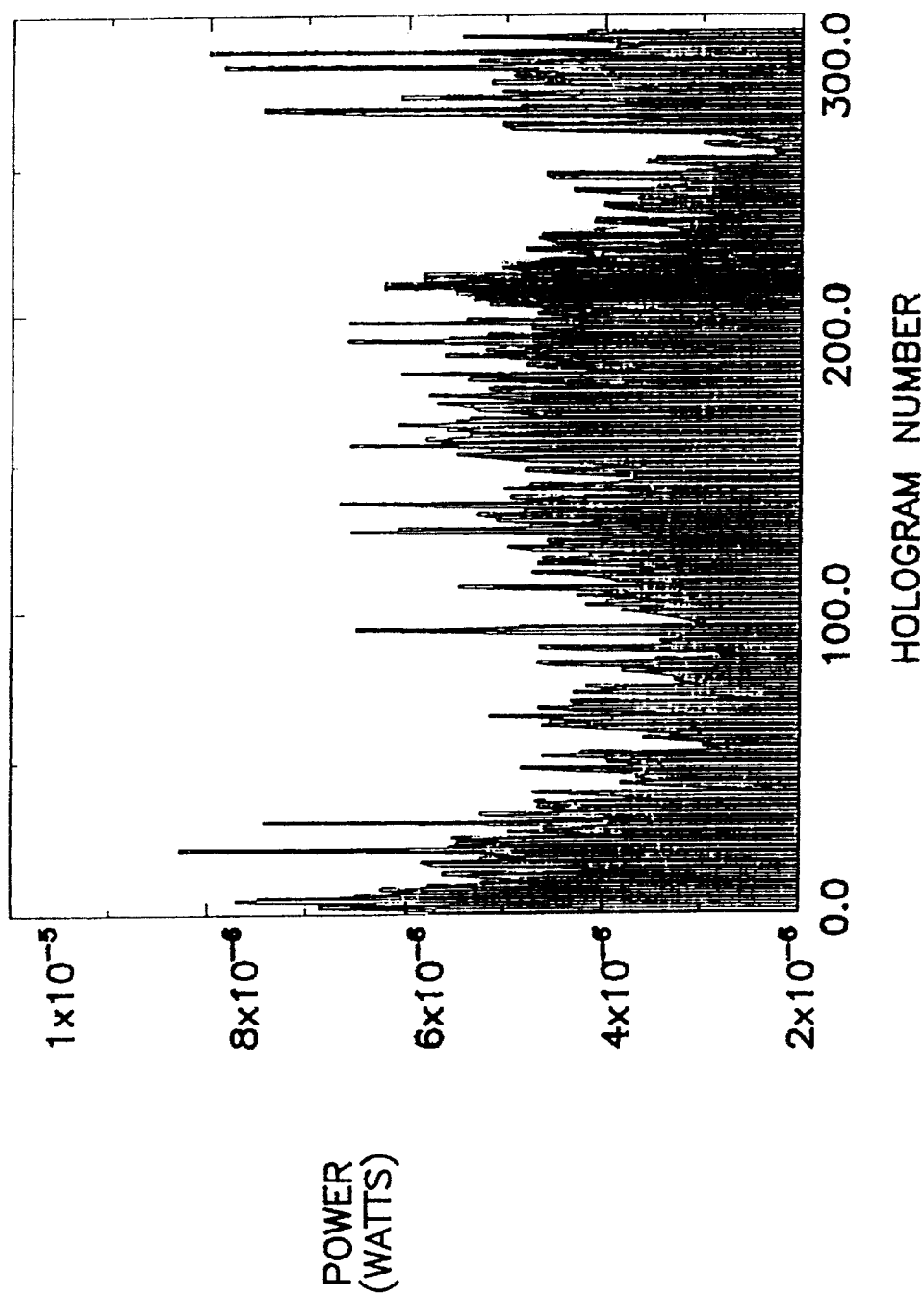
FIG. 3 is a graph illustrating the diffraction efficiency of each one of a succession of holograms recorded in the course of a demonstration of the embodiment of FIG. 1.

In all, 295 holograms stored in the polymer by peristrophic multiplexing 59 times and storing 5 angle-multiplexed holograms with each peristrophic position. The diffraction efficiency of the 295 holograms is plotted in FIG. 3. Each frame or hologram is numbered in FIG. 3 according to the sequence in which it was recorded. The average efficiency was $\sim 4\times 10^{-6}$ and the variations are primarily due to variation in the average intensity of the frames. In separate experiment, we stored equal amplitude plane wave holograms and observed a decrease in diffraction efficiency proportional to $1/M^2$.

Prior to the present invention, we stored M=10 holograms with roughly $10^{-3}$ diffraction efficiency limited by the angular bandwidth of the optical system. Peristrophic multiplexing made it possible to store M=295 holograms at the same location with a diffraction efficiency of $\sim 4\times 10^{-6}$. Thus, peristrophic multiplexing allowed for almost two orders of magnitude increase in the storage capacity of the DuPont photopolymer and changed the limiting factor from the angular bandwidth of the optical system to the dynamic range of the material.

In summary a method of multiplexing holograms by rotating the material or, equivalently, the recording beams, has been described. Peristrophic multiplexing can also be combined with other multiplexing methods to increase the storage density of holographic storage systems. Peristrophic multiplexing was experimentally demonstrated using DuPont's HRF-150 photopolymer film. A total of 295 holograms were multiplexed in a 38 μm thick photopolymer film by combining peristrophic multiplexing with angle multiplexing.

While the invention has been described with reference to the embodiment of FIG. 1 in which both the reference beam and signal beam approach the crystal or film 40 from the same side, other arrangements are possible in which, for example, the signal and reference beam approach the film 40 from opposite sides, in which case the detector plane of FIG. 1 would be located on the same side of the film 40 with the signal beam.

While the invention has been described in detail by specific reference to preferred embodiments, it is understood that variations and modifications thereof may be made without departing from the true spirit and scope of the invention.

What is claimed is:

1. A method of recording multiplexed holograms in a recording medium, comprising:

directing a signal light beam and a reference light beam onto a selected recording spot in said recording medium, said signal and reference light beams defining a plane of interaction of said recording medium;

successively modulating said signal light beam in accordance with a succession of holograms to be recorded in said recording medium; and first rotating at least one of (a) said recording medium and/or (b) said signal and reference light beams with respect to the other through a succession of peristrophic multiplexing angles about an axis non-perpendicular to said plane of interaction contemporaneously with the successively modulating step, said axis also being one which retains said signal light beam and said reference light beam on said recording spot.

2. The method of claim 1 wherein said axis non-perpendicular to said plane of interaction is parallel to said plane of interaction.

3. The method of claim 1 wherein said axis non-perpendicular to said plane of interaction in non-parallel to said plane of interaction.

4. The method of claim 1 wherein said signal and reference light beams are stationary and said first rotating step comprises rotating said recording medium about said axis non-perpendicular to said plane of interaction.

5. The method of claim 1 wherein said recording medium is stationary and said first rotating step comprises rotating said reference and signal beams at an incident surface of said recording medium about said axis non-perpendicular to said plane of interaction.

6. The method of claim 1 wherein successive ones of said succession of peristrophic multiplexing angles are separated by a predetermined difference angle.

7. The method of claim 6 wherein said predetermined difference angle is amount to spatially shift holographic projections of holograms recorded at successive ones of said angles by a predetermined amount.

8. The method of claim 6 wherein:

a selected hologram recorded in said recording medium is reproducible from said recording medium by projecting said reference beam onto said selected spot and providing a detector plane of a particular field of view at a location in a holographic projection beam path of said selected hologram; and said difference angle is an amount to shift out of said field of view an unselected one of said holograms recorded at a next one of said peristrophic multiplexing angles relative to the peristrophic multiplexing angle of said selected hologram.

9. The method of claim 6 wherein:

said selected hologram recorded in a recording medium is reproducible from said recording medium by projecting said reference beam onto said selected spot at the peristrophic multiplexing angle of said selected hologram; and said difference angle is sufficient to create a Bragg mismatch with said reference beam and an unselected one of said holograms recorded at a next one of said peristrophic multiplexing angles relative to the peristrophic multiplexing angle of said selected hologram.

10. The method of claim 1 wherein each of said holograms in said succession of holograms is recorded in said selected spot at a different peristrophic multiplexing angle whereby said holograms are peristrophically multiplexed only.

11. The method of claim 1 further comprising second rotating said recording medium through a second succession of angular multiplexing angles about an axis perpendicular to said plane of interaction, wherein at least one of said first rotating or said second rotating is performed simultaneously with said successively modulating.

12. The method of claim 11 wherein said successively modulating step successively modulates said signal beam with a sub-set of said succession of holograms corresponding to said succession of angular multiplexing angles while said second rotating step is performed and thereafter said first rotating step rotates said recording medium to a next one of said succession of peristrophic multiplexing angles.

13. The method of claim 12 wherein said sub-set of holograms corresponds to a maximum number of holograms that can be angularly multiplexed in a single recording spot in said medium.

14. A method of recording multiplexed holograms in a recording medium using a reference light beam and a signal light beam modulatable with successive holograms to be recorded, said signal and reference beams defining a plane of interaction of said recording medium, said method comprising:

recording a first set of plural multiplexed holograms in a selected recording spot in said recording medium;

rotating at least on of said recording medium and/or said signal and reference light beams relative to the other through a peristrophic multiplexing difference angle about an axis non-perpendicular to said plane of interaction contemporaneously with the successively modulating step; and recording a second set of plural multiplexed holograms in said selected recording spot.

15. The method of claim 14 wherein said axis non-perpendicular to said plane of interaction is parallel to said plane of interaction.

16. The method of claim 14 wherein said axis non-perpendicular to said plane of interaction is non-parallel to said plane of interaction.

17. The method of claim 14 wherein said signal and reference light beams are stationary and said first rotating step comprises rotating said recording medium about said axis non-perpendicular to said plane of interaction.

18. The method of claim 14 wherein said recording medium is stationary and said first rotating step comprises rotating said reference and signal beams at an incident surface of said recording medium about said axis non-perpendicular to said plane of interaction.

19. The method of claim 14 wherein said difference angle is sufficient to spatially shift holographic projections of holograms recorded at successive ones of said angles by a predetermined amount.

20. The method of claim 14 wherein:
said selected holograms recorded in said recording medium is reproducible from said recording medium by projecting said reference beam onto said selected spot and providing a detector plane of a particular field of view at a location in a holographic projection beam path of said selected hologram; and
said difference angle is sufficient to shift out of said field of view an unselected one of said holograms recorded at a next one of said peristrophic multiplexing angles relative to the peristrophic multiplexing angle of said selected hologram.

21. The method of claim 14 wherein:
said selected hologram recorded in said recording medium is reproducible from said recording medium by projecting said reference beam onto said selected spot at the peristrophic multiplexing angle of said selected hologram; and
said difference angle is sufficient to create a Bragg mismatch with said reference beam and an unselected one of said holograms recorded at a next one of said peristrophic multiplexing angles relative to the peristrophic multiplexing angle of said selected hologram.

22. The method of claim 14 wherein said step of recording a set of multiplexed holograms comprises second rotating said recording medium through a succession of angular multiplexing angles about an axis perpendicular to said plane of interaction while successively modulating said signal beam with a corresponding set of successive holograms.

23. The method of claim 22 wherein each of said first and second sets of multiplexed holograms corresponds to a maximum number of holograms that can be angularly multiplexed in a single recording spot in said medium.

24. The method of claim 14 wherein the step of recording a first set of multiplexed holograms employs a holographic multiplexing process.

25. The method of claim 24 wherein said multiplexing processing comprises one of the following multiplexing processes: (a) angular multiplexing, (b) wavelength multiplexing; (c) phase code multiplexing;

26. Apparatus for recording multiplexed holograms in a recording medium; comprising:
an optical element for directing a signal light beam and a reference light beam onto a selected recording spot in said recording medium, said signal and reference light beams defining a plane of interaction of said recording medium;
an element for successively modulating said signal light beam in accordance with a succession of holograms to be recorded in said recording medium; and
a rotation device for rotating at least of said recording medium and/or said signal and reference light beams with respect to the other through a succession of peristrophic multiplexing angles about an axis non-perpendicular to said plane of interaction, said axis being one which retains said light beam and said reference light beam on said recording spot, said rotation device being operated contemporaneously with said means for successively modulating.

27. The apparatus of claim 26 wherein said axis non-perpendicular to said plane of interaction is parallel to said plane of interaction.

28. The apparatus of claim 26 wherein said axis non-perpendicular to said plane of interaction is non-parallel to said plane of interaction.

29. The apparatus of claim 26 wherein said signal and reference light beams are stationary and said rotation device comprises means for rotating said recording medium about said axis non-perpendicular to said plane of interaction.

30. The apparatus of claim 26 wherein said recording medium is stationary and said rotation device comprises means for rotating said reference and signal beams at an incident surface of said recording medium about said axis non-perpendicular to said plane of interaction.

31. The apparatus of claim 26 wherein successive ones of said succession of peristrophic multiplexing angles are separated by a predetermined difference angle.

32. The apparatus of claim 31 wherein said predetermined difference angle is sufficient to spatially shift holographic projections of holograms recorded at successive ones of said angles by a predetermined amount.

33. The apparatus of claim 31 wherein:
said selected hologram recorded in said recording medium is reproducible from said recording medium by projecting said reference beam onto said selected spot, said apparatus further comprising a detector plane of a particular field of view at a location in a holographic projection beam path of said selected hologram; and
said difference angle is sufficient to shift out of said field of view an unselected one of said holograms recorded at a next one of said peristrophic multiplexing angles relative to the peristrophic multiplexing angle of said selected hologram.

34. The apparatus of claim 31 wherein:
said selected hologram recorded in said recording medium is reproducible from said recording medium by projecting said reference beam onto said selected spot at the peristrophic multiplexing angle of said selected hologram; and
said difference angle is sufficient to create a Bragg mismatch with said reference beam and an unselected one of said holograms recorded at a next one of said peristrophic multiplexing angles relative to the peristrophic multiplexing angle of said selected hologram.

35. The apparatus of claim 26 wherein each of said holograms in said succession of holograms is recorded in said selected spot at a different peristrophic multiplexing angle whereby said holograms are peristrophically multiplexed only.

36. The apparatus of claim 26 further comprising section means for rotating said recording medium through a succession of angular multiplexing angles about an axis perpendicular to said plane of interaction, wherein said means for successively modulating operates simultaneously with one of (a) said first means for rotating, (b) said second means for rotating.

37. The apparatus of claim 36 wherein said succession of holograms corresponds to said succession of angular multiplexing angles and does not exceed a maximum number of holograms that can be angularly multiplexed in a single recording spot in said medium.

38. The apparatus of claim 36 wherein said succession of holograms corresponds to said succession of peristrophic multiplexing angles and does not exceed a maximum number of holograms that can be peristrophically multiplexed in a single recording spot in said medium.

39. A method of processing plural holograms in a recording medium with an input pattern, comprising:

directing a signal light beam and a reference light beam onto a selected recording spot in said recording medium, said signal and reference light beams defining a plane of interaction of said recording medium;

successively modulating said signal light beam in accordance with a succession of holograms to be recorded in said recording medium; and first rotating at least one of said recording medium and/or said signal and reference light beams with respect to the other through a succession of peristrophic multiplexing angles about an axis non-perpendicular to said plane of interaction contemporaneously with the successively modulating so as to record said succession of holograms at different peristrophic multiplexing angles at said selected recording spot in said medium, said axis being one which retains said signal light beam and said reference light beam on said recording spot;

blocking said reference beam from said recording medium while constantly modulating said signal light beam with said input pattern;

second rotating at least one of said recording medium and said signal and reference light beams with respect to the other through said succession of peristrophic multiplexing angles about an axis non-perpendicular to said plane of interaction; and detecting a succession of similarity patterns at a correlation detection plane in line with a path of now-blocked reference beam simultaneously with said second rotating step.

40. The method of claim 39 wherein said axis non-perpendicular to said plane of interaction parallel to said plane of interaction.

41. The method of claim 39 wherein said axis non-perpendicular to said plane of interaction is non-parallel to said plane of interaction.

42. The method of claim 39 wherein said signal and reference light beams are stationary and said first rotating step comprises rotating said recording medium about said axis non-perpendicular to said plane of interaction.

43. The method of claim 39 wherein said recording medium is stationary and said first rotating step comprises rotating said reference and signal beams at an incident surface of said recording medium about said axis non-perpendicular to said plane of interaction.

44. An optical holographic processor including a recording medium for producing a correlation between an input pattern and one of a succession of peristrophically multiplexed holograms previously recorded in said medium by directing a signal light beam and a reference light beam onto a selected recording spot in said recording medium, said signal and reference light beams defining a plane of interaction of said recording medium, successively modulating said signal light beam in accordance with said succession of holograms while simultaneously rotating one of (a) said recording medium and (b) said signal and reference light beams relative to the other through a succession of peristrophic multiplexing angles about an axis non-perpendicular to said plane of interaction, said processor comprising:

a means for defining a correlation detection plane in line with a path of said reference beam;

means for modulating said signal light beam in accordance with said input pattern while blocking said reference beam from said medium;

means for rotating one of (a) said recording medium and (b) said signal light beam relative to the other through said succession of peristrophic multiplexing angles about an axis non-perpendicular to said plane of interaction, said means for rotating being operable contemporaneously with said means for modulating so as to produce a succession of similarity patterns as said correlation detection plane.

\* \* \* \* \*